(12) United States Patent
Hakuta et al.

(10) Patent No.: US 8,385,696 B2
(45) Date of Patent: Feb. 26, 2013

(54) OPTICAL NANOFIBER RESONATOR

(75) Inventors: Kohzo Hakuta, Chofu (JP); Kien Le Pham, Chofu (JP)

(73) Assignee: The University of Electro-Communications, Chofu-Shi (JP)

( * ) Notice: Subject to any disclaimer, the term of this patent is extended or adjusted under 35 U.S.C. 154(b) by 173 days.

(21) Appl. No.: 12/945,036

(22) Filed: Nov. 12, 2010

(65) Prior Publication Data

US 2012/0121221 A1   May 17, 2012

(51) Int. Cl.
| | |
|---|---|
| *G02B 6/34* | (2006.01) |
| *G02B 6/00* | (2006.01) |
| *G02B 6/12* | (2006.01) |
| *G02B 6/10* | (2006.01) |
| *H01S 3/30* | (2006.01) |
| *H01S 3/00* | (2006.01) |

(52) U.S. Cl. ............. 385/37; 385/12; 385/14; 385/129; 359/341.1; 372/6

(58) Field of Classification Search .................... 385/12, 385/14, 32, 37, 129–132; 372/92, 94, 6; 359/341.1
See application file for complete search history.

(56) References Cited

U.S. PATENT DOCUMENTS

| | | | | |
|---|---|---|---|---|
| 4,780,877 | A * | 10/1988 | Snitzer | 372/6 |
| 6,816,514 | B2 * | 11/2004 | Jiang et al. | 372/6 |
| 2005/0220403 | A1 * | 10/2005 | Dykaar | 385/31 |

OTHER PUBLICATIONS

Nayak et al. Antibunching and bunching of photons in resonance fluorescence from a few atoms into guided modes of an optical nanofiber, Physical Review A 79, 021801(R) Feb. 11, 2009, pp. 1-4, 1050-2947/2009/79(2)/021801(4), The American Physical Society.
Le Kien et al. Cavity-enhanced channeling of emission from an atom into a nanofiber, Physical Review A 80, 053826 (2009), Nov. 24, 2009, pp. 1-15, 1050-2947/2009/80(5)/053826(15), The American Physical Society.

\* cited by examiner

*Primary Examiner* — Brian Healy
*Assistant Examiner* — Hung Lam
(74) *Attorney, Agent, or Firm* — Ditthavong Mori & Steiner, P.C.

(57) ABSTRACT

To provide an optical nanofiber resonator having an optical waveguide whose diameter is equal to or smaller than the wavelength of a propagation light, a light emitter disposed at a predetermined position of the optical waveguide, and a first reflector and a second reflector formed in the optical waveguide with the light emitter interposed therebetween, wherein at least one of the first reflector and the second reflector transmits a part of the propagation light. With such a configuration, the channeling efficiency of the light emitted from the light emitter and the propagation mode of the optical waveguide is dramatically improved.

12 Claims, 12 Drawing Sheets

OPTICAL NANOFIBER RESONATOR

BACKGROUND OF THE INVENTION

1. Field of the Invention

The present invention relates to an optical nanofiber resonator adapted to generate photons and emit the generated photons.

2. Description of the Related Art

Recently, with increase in information communication traffic, there is a desire to develop a new technology capable of dramatically promoting high-level security guarantee technology and high-speed communication technology. As a communication technology capable of solving the problems, quantum information communication technology is being actively studied and developed around the world.

The quantum information communication technology is a communication technology for generating photons (quanta) and manipulating the generated photons, and is a new communication technology to which quantum mechanics principle is directly applied. To be specific, the quantum information communication technology is a technology for performing information communication with the photons (quanta) as a mediator, wherein the photons are transmitted through a transmission path such as an optical fiber while the photons are maintained in quantum state. In the quantum information communication, since information communication is performed with the photons as a mediator, single photons or correlated photon pairs (photons in pairs) are fundamental elements of information transmission.

One of the main objects of developing the quantum information communication technology is to achieve quantum cryptographic communication. Conventionally, methods for encrypting information are employed in various developed communication systems in order to prevent information interception during communication, but the encryption employed now is not always safe. However, this problem can be solved by the quantum cryptographic communication.

As described above, in the quantum information communication, communication is performed while the photons are maintained in quantum state. However, during transmission of the photons, if the information is viewed (i.e., intercepted) by a third person, the quantum state of the photons will change, and therefore the recipient will know that the information has been viewed by a third person. Thus, in the quantum cryptographic communication, if encryption key is sent using this nature of the quantum information communication, interception is impossible in principle.

Photon generation technology is an indispensable element technology for developing the aforesaid quantum information communication and quantum cryptographic communication. As a single photon generating device, there are conventionally proposed, for example, a device in which an InAs single quantum dot is arranged in an optical micropillar resonator produced by precisely nano-processing a GaAs semiconductor, and a device in which a single quantum dot is arranged in a silver nanowire. In these devices, the quantum dots are laser-excited to generate photons, and the generated single photons are emitted to a predetermined direction. In such single photon generating devices, photon generation efficiency is relatively high; however the loss while the emitted photons is coupled to the guided mode of the optical fiber (i.e., the loss while the emitted photons is introduced into the optical fiber) is large.

Further, as a single photon generating device, there is conventionally proposed a device using a micro-resonator configured by micro concave mirrors. In such a device, an atom is disposed between the micro concave mirrors, and the atom is laser-excited; and at this time, a strong coupled state is established between the light-emitting atom and the resonator, so that photons are emitted.

Further, in nonpatent documents such as Physical Review A, Vol. 79, 021801, 2009, there is proposed a single photon generating element using an optical fiber (referred to as "optical nanofiber" hereinafter) having a diameter of substantially half wavelength of the propagation light. FIG. 15 is a view schematically showing the configuration of a single photon generating element using an optical nanofiber.

A single photon generating element 100 includes an optical nanofiber 101, and single light emitters 102. The optical nanofiber 101 is produced by heating and elongating a part of a conventional optical fiber for communication used in a communication system to form an ultrafine portion 103, wherein the diameter of the optical fiber for communication is substantially in a range of, for example, several tens µm to 100 µm, and wherein the diameter of the ultrafine portion 103 is of nanometer order. Thus, the appearance of the optical nanofiber 101 is such that the diameter of the optical nanofiber 101 becomes continuously smaller along the extending direction from one end thereof, becomes a size of nanometer order near the center thereof (i.e., in the ultrafine portion 103), and then becomes continuously larger along the extending direction toward the other end thereof.

Two optical fiber portions 104 respectively formed at both ends of the optical nanofiber 101 have the same configuration as that of the optical fiber for communication, and include a core 105 and a clad 106. Further, the single light emitters 102 are disposed on the ultrafine portion 103.

Incidentally, in order to clearly show the configuration of the single photon generating element 100, the single light emitters 102 are shown in the same size as that of the ultrafine portion 103 of the optical nanofiber 101 in FIG. 15, but actually the diameter of the ultrafine portion 103 is about 400 nm while the diameter of the single light emitters 102 is about 5 to 10 nm. Further, in order to clearly show the configuration of the optical fiber portion 104, the ratio of the diameter of core 105 to the diameter of the clad 106 is enlarged in FIG. 15, but the actual ratio of the diameter of core 105 to the diameter of the clad 106 is about 1:10.

In the single photon generating element 100 shown in FIG. 15, the single light emitters 102 are irradiated with a laser beam 107 so as to be excited. Thus, a light (photons) having a predetermined wavelength is emitted by spontaneous emission from the single light emitters 102, and the emitted photons are channeled from the ultrafine portion 103 into the optical nanofiber 101. Further, the photons channeled into the optical nanofiber 101 are emitted to the outside through the optical fiber portions 104 that has the same configuration as that of a conventional optical fiber for communication.

FIG. 16 is a graph showing a measured result of the photons emitted from the optical fiber portion 104 of the single photon generating element 100 having the aforesaid configuration, the measured result being obtained by detecting the photons with a highly-sensitive photon detector through an optical fiber network. The horizontal axis of the characteristic graph of FIG. 16 represents measurement time, and the vertical axis represents output (counts) of the photon detector. Incidentally, such experiment was performed while continuously exciting the single light emitters 102 (i.e., the quantum dots).

It can be known from the measured result shown in FIG. 16 that, in the output characteristics of the photon detector, durations while the output value is close to zero are appeared from time to time, which means there are durations while no photon is detected. Since the single light emitters 102 are continuously excited as described above, if a plurality of photons are generated at the same time, several of the plurality of photons will inevitably be detected by the photon detector. In such a case, durations while no photon is detected will not appear in the output characteristics detected by the photon detector. In other words, the measured result shown in FIG. 16 indicates that it is possible to emit the single photon with the single photon generating element 100 that uses the optical nanofiber, and it is possible obtain the single photon through the optical fiber network.

Further, in the single photon generating element 100 that uses the optical nanofiber, since it is possible to directly channel the photons into an external optical fiber through the guided mode of the optical fiber, the problem of the loss while the photons emitted from a device using an optical micropillar resonator or a silver nanowire is introduced into the optical fiber can be solved.

However, in the method using the optical nanofiber, coupling efficiency between the light emitted by spontaneous emission from the single light emitters 102 and propagation mode of the optical nanofiber 101 is low (i.e., channeling efficiency of the photons from the single light emitters 102 into the optical nanofiber 101 is low), and that is a problem.

SUMMARY OF THE INVENTION

In view of the above problem, it is an object of the present invention to increase channeling efficiency of photons from a light emitter into an optical nanofiber in a photon generation device using an optical nanofiber.

In order to solve the aforesaid problems, an optical nanofiber resonator according to an aspect of the present invention includes an optical waveguide whose diameter is equal to or smaller than the wavelength of a propagation light, a light emitter disposed at a predetermined position of the optical waveguide, and a first reflector and a second reflector formed in the optical waveguide with the light emitter interposed therebetween, wherein at least one of the first reflector and the second reflector transmits a part of the propagation light.

Incidentally, the "light emitter" referred to in the present invention means a nanometer-size light emitter such an atom, a molecule, a quantum dot (artificial atom) and the like, which has a discrete energy level and which is placed in a state where single excitation is possible (i.e., which exhibits quantum character).

As described above, in the optical nanofiber resonator according to the present invention, the first reflector and the second reflector is formed in the optical waveguide with the light emitter interposed therebetween, and thereby a resonator configuration is formed. With such a configuration, it is possible to improve the channeling efficiency of the photons from the light emitter into the optical waveguide.

DETAILED DESCRIPTION OF THE PREFERRED EMBODIMENTS

Configuration examples of an optical nanofiber resonator according to embodiments of the present invention will be described below with reference to the attached drawings; and it should be noted that the present invention is not limited to the examples described below.

1. First Embodiment

Configuration of Optical Nanofiber Resonator

Figure 1:
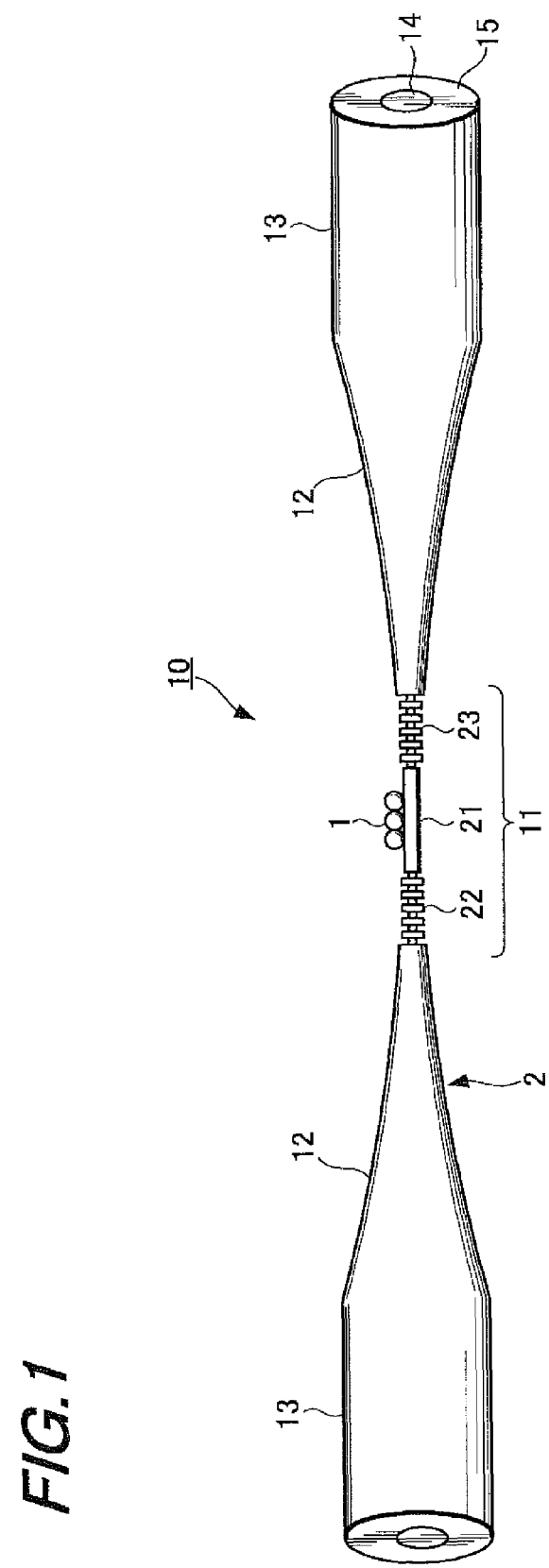
FIG. 1 is a view schematically showing the configuration of an optical nanofiber resonator according to a first embodiment of the present invention.

FIG. 1 schematically shows the configuration of an optical nanofiber resonator according to a first embodiment of the present invention. The optical nanofiber resonator 10 includes light emitters 1 and an optical nanofiber 2 extending in a predetermined direction (i.e., in the right-left direction of FIG. 1).

The light emitters 1 are arranged on an ultrafine portion (i.e., a resonator portion 11, which is to be described later) of the optical nanofiber 2. The light emitters 1 are composed of atoms, molecules, quantum dots (artificial atoms) or the like. The light emitters 1 are maintained so as to have discrete energy level (i.e., have quantum character), and if the light emitters 1 are laser-excited, a light (photons) having a predetermined wavelength will be emitted by spontaneous emission. Incidentally, the wavelength of the light emitted from the light emitters 1 varies depending on the kind of the light emitters 1. For example, quantum dots such as CdSe nanocrystals (CdSeTe semiconductor), nanodiamonds or the like can be used as the light emitters 1.

Incidentally, in order to clearly show the configuration of the optical nanofiber resonator 10, the diameter of the light emitters 1 is substantially the same as the diameter of the ultrafine portion of the optical nanofiber 2 in FIG. 1, but actually the diameter of the ultrafine portion is about 400 nm, for example, while the diameter of the light emitters 1 is about 5 to 10 nm. Further, when describing other embodiments later, in order to clearly show the configuration of the optical nanofiber resonator, the ratio of the size of the light emitter to the size of the ultrafine portion of the optical nanofiber in the drawings showing the configuration of the optical nanofiber resonator is also larger than the actual component ratio.

The optical nanofiber 2 includes the resonator portion 11, two connecting portions 12 respectively arranged on both ends of the resonator portion 11, and two optical fiber portions 13 each arranged on an end of each connecting portion 12 on the opposite side to the resonator portion 11 side. Incidentally, all portions of the optical nanofiber 2 have a circular cross-section, and are formed of light transmissive material such as quartz, a polymer or the like.

Incidentally, as will be described later, the optical nanofiber 2 is produced by heating and elongating a part of a conventional optical fiber for communication used in communication system, wherein the optical fiber includes a core and a clad. Within the connecting portion 12, in the area whose diameter is equal to or smaller than the cut-off diameter of the core, there is actually no difference between the core and the clad of the optical fiber with respect to the propagation light, and therefore the optical fiber in such area is in a state equivalent to a state where there is only core. In other words, the resonator portion 11 is actually in a state where there is only the core. In such a case, the surrounding area of the resonator portion 11 (i.e., the free space) serves as the clad.

The resonator portion 11 includes an optical waveguide portion (an optical waveguide) 21, a first reflector 22 arranged in an end area of one side (the left side of FIG. 1) of the optical waveguide portion 21, and a second reflector 23 arranged in an end area of the other side (the right side of FIG. 1) of the optical waveguide portion 21.

The optical waveguide portion 21 is an optical waveguide extending in a predetermined direction, and has a diameter substantially equal to or less than the wavelength of the propagation light. In the present embodiment, it is preferred that the diameter of the optical waveguide portion 21 is substantially equal to the half wavelength of the propagation light. For example, in the case where the wavelength of the propagation light (i.e., the wavelength of the light emitted from the light emitters 1 to the optical nanofiber 2) is substantially 850 nm, it is preferred that the diameter of the optical waveguide portion 21 is substantially 400 nm.

In the present embodiment, the first reflector 22 and the second reflector 23 have the same configuration. The first reflector 22 and the second reflector 23 configure a resonator, reflect the light channeled from the light emitters 1 into the optical waveguide portion 21, and create a resonant state of the emitted light (i.e., the propagation light) between the first reflector 22 and the second reflector 23.

The first reflector 22 and the second reflector 23 can be formed by, for example, fiber Bragg gratings (FBG). In such a case, the configuration of the first reflector 22 and the second reflector 23 (for example, width, depth, pitch and the like of the gratings) is determined so that the Bragg reflection condition is satisfied with respect to the propagation light. Thus, the configuration of the first reflector 22 and the second reflector 23 is suitably determined according to the wavelength of the light emitted from the light emitters 1 (i.e., according to the kind and the like of the light emitters 1).

The first reflector 22 and the second reflector 23 each transmit a part of the propagation light. Thus, the photons can be emitted from the both ends of the resonator portion 11 to the outside through the corresponding connecting portions 12 and optical fiber portions 13.

Thus, as will be described later, it is possible to increase the coupling efficiency between the light emitted from the light emitters 1 and the propagation mode of the optical nanofiber 2 by providing the resonator portion 11 (which is configured by the optical waveguide portion 21, the first reflector 22 and the second reflector 23) in the ultrafine portion of the optical nanofiber 2 as described above.

The connecting portion 12 is an optical waveguide extending in a predetermined direction; and the diameter of the connecting portion 12 becomes continuously larger from the resonator portion 11 toward the optical fiber portion 13. In other words, the connecting portion 12 is a taper-shaped optical waveguide whose diameter becomes continuously larger from the resonator portion 11 toward the optical fiber portion 13.

The optical fiber portion 13 includes a core 14 and a clad 15 arranged around the core 14, and has the same configuration as that of a conventional optical fiber used in communication system. Further, the diameter of the optical fiber portion 13 is substantially in a range of several tens μm to 100 μm, which is identical to that of a conventional optical fiber. Thus, it is possible to directly connect the optical fiber portion 13 to an external optical fiber network (i.e., information communication network).

Incidentally, in order to clearly show the configuration of the optical fiber portion 13, the ratio of the diameter of core 14 to the diameter of the clad 15 is enlarged in FIG. 1, however the actual ratio of the diameter of core 14 to the diameter of the clad 15 is about 1:10. Further, when describing other embodiments later, in order to clearly show the configuration of the optical fiber portion, the ratio of the diameter of the core 14 to the diameter of the clad 15 in the drawings showing the configuration of the optical fiber portion is also larger than the actual component ratio.

In other words, in the optical nanofiber resonator 10 according to the present embodiment, the photons radiated from the resonator portion 11 can be directly emitted to the external optical fiber network (i.e., the information communication network) through the propagation mode of the optical fiber.

[Method for Producing Optical Nanofiber Resonator]

A method for producing the optical nanofiber resonator 10 will be described below. First, a conventional optical fiber for communication is prepared, the optical fiber including a core and a clad.

Next, the optical fiber for communication is elongated while a part of the optical fiber for communication (to be specific, the area near the resonator portion 11) is heated. At this time, the optical fiber for communication is elongated so that the diameter of the heated area becomes a predetermined value. By performing such a process, the optical waveguide portion 21 whose diameter is of nanometer order is formed, and at the same time the connecting portions 12 and the optical fiber portions 13 are formed.

Next, the first reflector 22 and the second reflector 23 are formed respectively in the areas near both ends of the optical waveguide portion 21. Incidentally, a method for forming the first reflector 22 and the second reflector 23 will be described later.

After the first reflector 22 and the second reflector 23 are formed in the optical waveguide portion 21, the light emitters 1 are disposed at a predetermined position between the first reflector 22 and the second reflector 23. For example, in the case where the quantum dots composed of, for example, CdSe nanocrystals are used as the light emitters 1, the light emitters 1 are disposed on the resonator portion 11 by dripping a solvent containing colloidal CdSe nanocrystals to a predetermined position between the first reflector 22 and the second reflector 23 by a pipette or the like for example.

Incidentally, the method for disposing the light emitters 1 is not limited to the aforesaid method, but other methods can be suitably selected according to, for example, the kind of the light emitters 1 to be used, the diameter of the optical waveguide portion 21 and the like. In the present embodiment, the optical nanofiber resonator 10 is produced in the aforesaid manner.

[Method for Forming Reflectors]

The first reflector 22 and the second reflector 23 can be formed using various methods. For example, the first reflector 22 and the second reflector 23 can be formed by a focused-ion-beam (FIB) process.

In the FIB process, an ion beam is irradiated along the extending direction of the optical waveguide portion 21 at a predetermined interval (i.e., at a predetermined pitch) to thereby form a plurality of recessed holes in the optical waveguide portion 21, so that the reflectors (gratings) are configured. Incidentally, in the case where the FIB process is employed, it is difficult to form circular grooves in the whole circumference of the optical waveguide portion 21 along the circumferential direction to configure the reflectors shown in FIG. 1, however the same reflecting function can be achieved by configuring the reflectors by forming a plurality of recessed holes in the following manner.

Figure 2:
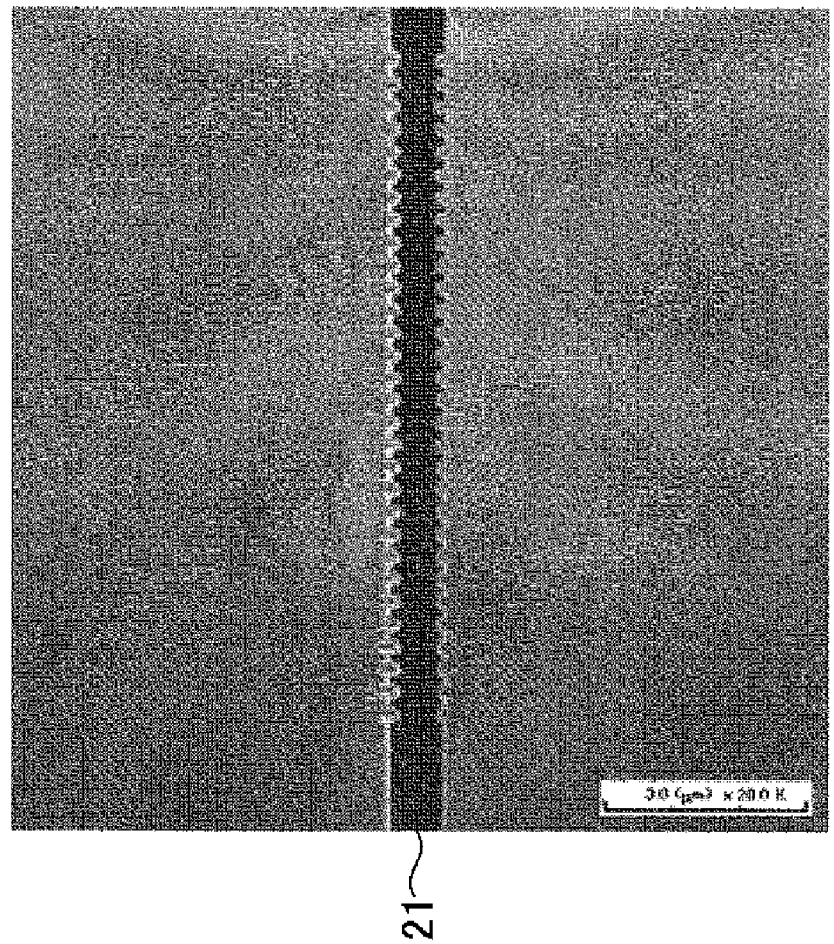
FIG. 2 is an image showing a cross-section formed while forming a reflector by a FIB (Focused Ion Beam) process.

FIG. 2 is an image showing a cross-section of an area near gratings formed in the optical waveguide portion 21 by the FIB process. In the example shown in FIG. 2, gratings each having a depth of 100 nm and a width of 130 nm are formed in the optical waveguide portion 21 which has a diameter of 580 nm.

Figure 3:
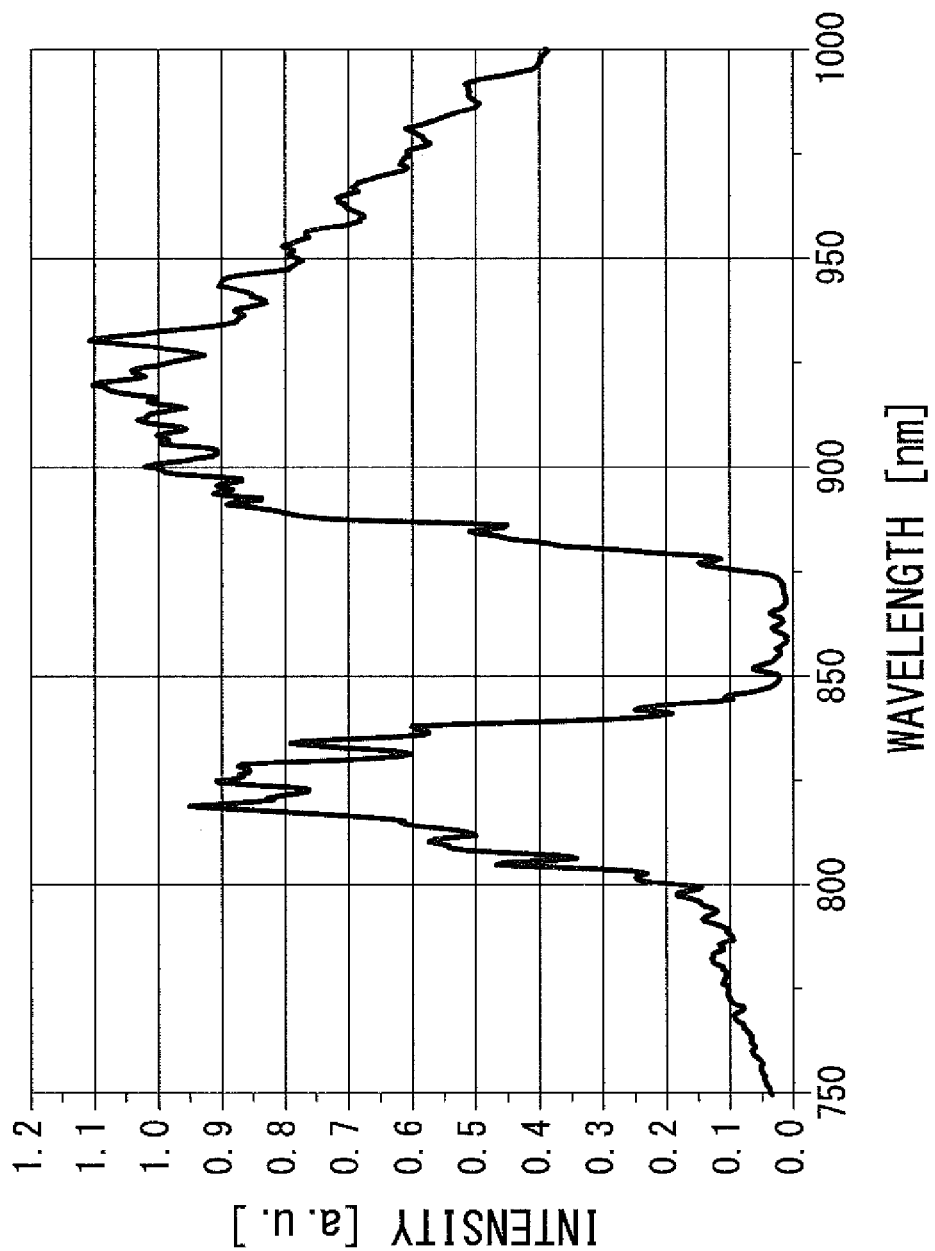
FIG. 3 is a graph showing transmission characteristics of the reflector formed by the FIB process.

FIG. 3 is a characteristic graph showing transmission characteristics of the gratings formed in the optical waveguide portion 21 by the FIB process. Incidentally, the horizontal axis of the characteristic graph of FIG. 3 represents wavelength of the propagation light, and the vertical axis represents transmission intensity. It can be known from FIG. 3 that, with respect to a light having a predetermined wavelength (a wavelength near about 860 nm in the example shown in FIG. 3), transmissivity is reduced to 10%, and reflectivity becomes 90%. It can be known that the gratings formed by the FIB process function as a reflector.

Figure 4:
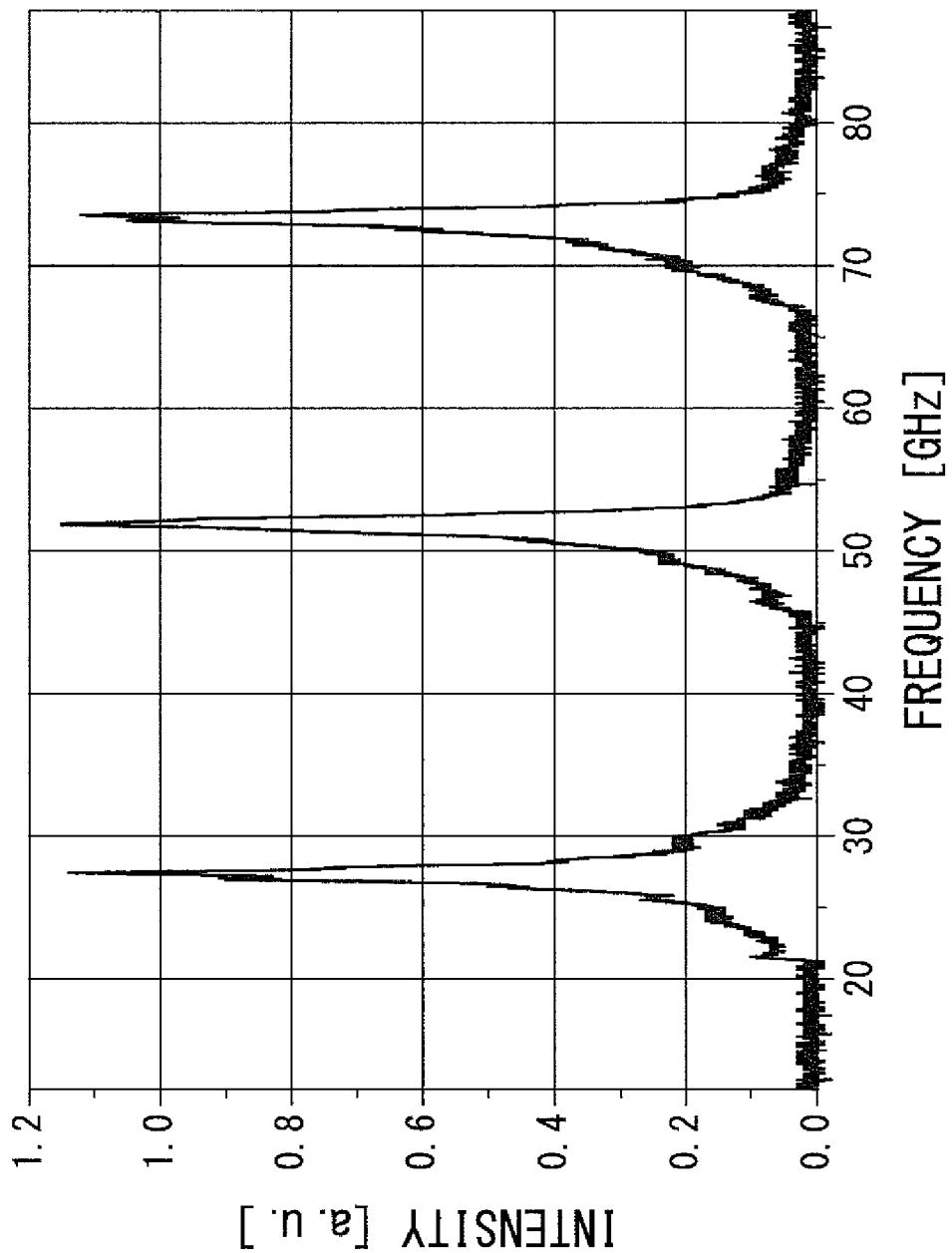
FIG. 4 is a graph showing frequency characteristics of the resonator formed by the FIB process.

FIG. 4 is a characteristic graph showing frequency characteristics (intensity characteristics) of the resonator formed in the optical waveguide portion 21 by the FIB process. Incidentally, the horizontal axis of the characteristic graph of FIG. 4 represents frequency, and the vertical axis represents intensity.

It can be known from FIG. 4 that, in the resonator formed by the FIB process, the frequencies showing peak intensity discretely appear at a predetermined frequency interval. This indicates that standing waves having different frequencies generate between the first reflector 22 and the second reflector 23 formed by the FIB process. In other words, it can be known from the result shown in FIG. 4 that the resonator formed by the FIB process operates in the same manner as a general resonator.

Further, finesse F of the resonator configured by the optical waveguide portion 21, the first reflector 22 and the second reflector 23 can be obtained based on the frequency characteristics shown in FIG. 4, and in the example of FIG. 4, the finesse F is 20. Incidentally, the finesse F is a parameter which represents the number of reciprocations until the light propagating with the resonator is emitted to the outside.

It can be known from the results shown in FIGS. 2 to 4 that the FIB process can be used as a method for forming the first reflector 22 and the second reflector 23 in the optical waveguide portion 21. However, the method for forming the first reflector 22 and the second reflector 23 is not limited to the FIB process, but may include other methods such as a photoetching method, a nano-impriting method and the like.

For example, in the photoetching method, first, a photomask is formed in the area excluding the area for forming the first reflector 22 and the second reflector 23 by using a photolithography technology. Next, the area not photomasked of the optical waveguide portion 21 is etched, and thereby grooves are formed in the optical waveguide portion 21 at a predetermined interval. As a result, the first reflector 22 and the second reflector 23 are formed in the optical waveguide portion 21 by forming a plurality of grooves and a part of the optical waveguide portion 21 between the grooves.

Further, for example, in the nano-impriting method, first, a mold having a recessed and projected pattern formed in the surface thereof is prepared, wherein the size of the recessed and projected pattern is in a range of several tens nm to several hundreds nm. Next, the recessed and projected pattern of the mold is transferred onto the optical waveguide portion 21 formed of, for example, a polymer, and thereby a recessed and projected pattern having a predetermined pitch is formed in the optical waveguide portion 21, so that the first reflector 22 and the second reflector 23 are formed.

[Characteristic Evaluation of Optical Nanofiber Resonator]

The inventor of the present invention evaluated the characteristics of the optical nanofiber resonator having the aforesaid configuration by performing numerical analyses based on quantum mechanics. The evaluation result obtained by performing the numerical analyses will be described below. Note that, in the numerical analyses below, the analysis results to be described are obtained based on a configuration in which the light emitters 1 are arranged at the center between the first reflector 22 and the second reflector 23 and on the surface of the optical waveguide portion 21.

First, the principle of the numerical analyses (i.e., main formulas used in the numerical analysis) will be briefly described below. In the case where the first reflector 22 and the second reflector 23 are not formed in the optical waveguide portion 21 (i.e., in the case where the configuration is identical to the single photon generating element 100 shown in FIG. 15), among the light emitted by spontaneous emission from the light emitters 1, the rate of the light radiated to the free space of the outside $\gamma_{rad}$ (referred to as "rate of radiation mode" hereinafter) is expressed by the following formula (1).

$$\gamma_{rad} = 2\pi \sum_{\nu} |G_\nu|^2 \delta(\omega - \omega_0) \tag{1}$$

Incidentally, "$G_\nu$" in formula (1) represents a coefficient which indicates the coupling between the light emitters 1 and the radiation mode of index μ. Further, "ω" represents the frequency of the light propagating between the first reflector 22 and the second reflector 23 (i.e., within the cavity), and "$\omega_0$" represents the atomic transition frequency (i.e., the frequency of the light emitted from the light emitters 1).

On the other hand, among the light emitted from the light emitters 1, the rate $\nu_{gyd}$ of the light propagating within the optical nanofiber 2 (the optical waveguide portion 21), which will be referred to as "rate of propagation mode" hereinafter, is expressed by the following formula (2).

$$\gamma_{gyd} = \frac{2\pi\omega_0 d^2}{\varepsilon_0 h v_g}(|e_{-q}|^2 + |e_q|^2) \quad (2)$$

Incidentally, "d" in formula (2) represents the spherical component of the dipole vector of the light emitters 1 (atoms). "$|e_{\pm q}|$" (q=−1, 0 or 1) represent the magnitudes of the spherical components of the resonant guided-mode functions. "$v_g$" represents group velocity of the resonant guide field. Further, "$\varepsilon_0$" represents permittivity of vacuum, and "h" represents Planck's constant.

Further, efficiency η of the coupling of the light emitted from the light emitters 1 to the propagation mode of the optical waveguide portion 21 (simply referred to as "coupling efficiency" hereinafter) is expressed by the following formula (3).

$$\eta = \frac{\gamma_{gyd}}{\gamma_{rad} + \gamma_{gyd}} \quad (3)$$

In contrast, in the case of the resonator of the present embodiment in which the first reflector 22 and the second reflector 23 are arranged in the optical waveguide portion 21, due to the resonance effect within the optical waveguide portion 21, rate of propagation mode $\gamma_{cavgyd}$ increases. To be specific, the coupling efficiency $\eta_c$ of the optical nanofiber resonator 10 of the present embodiment is expressed by the following formula (4).

$$\eta_c = \frac{\gamma_{cavgyd}}{\gamma_{rad} + \gamma_{cavgyd}} = \frac{G_0 \gamma_{gyd}}{\gamma_{rad} + G_0 \gamma_{gyd}} \quad (4)$$

"$G_0$" in formula (4) represents enhancement factor of the propagation mode, and is expressed by the following formula (5).

$$G_0 \frac{1 + |R|^2 + 2|R|\cos\Phi_0\cos(2\beta_0 z)}{1 - |R|^2 + 4|R|^2(1 - |R|^2)^{-1}\sin^2\Phi_0} \quad (5)$$

"|R|" in formula (5) represents complex amplitude reflectivity of the first reflector 22 and second reflector 23. "$|R|^2$" represents power reflectivity of the reflector, and will be simply referred to as "reflectivity" hereinafter. "$\beta_0$" represents propagation factor of the resonant guided light which propagates between the first reflector 22 and the second reflector 23 (i.e., within the cavity). Incidentally, the propagation factor $\beta_0$ of the resonant guided light varies according to the radius a of the optical waveguide portion 21. "$\Phi_0$" in formula (5) represents the resonant-light phase shift per cavity crossing with a single reflection, and varies according to cavity length L (i.e., the distance between the first reflector 22 and the second reflector 23). "z" represents the position of the extending direction of the optical waveguide portion 21.

Further, in the case where resonance condition is satisfied between the first reflector 22 and the second reflector 23, since $\Phi_0$=mπ (m is an integer), formula (5) can be rewritten to the following formula (6).

$$G_0 \frac{1 + |R|^2 + 2|R|\cos(2\beta_0 z + m\pi)}{1 - |R|^2} \quad (6)$$

When reflectivity $|R|^2$ of the first reflector 22 and the second reflector 23 is 0.8 to 0.9, the maximum value $G_{0max}$(=(1+|R|)/(1−|R|)) of the enhancement factor $G_0$ of the propagation mode will be about 18 to 38. In such a case, the finesse F (=π|R|/(1−|R|$^2$)) of the resonator configured by the first reflector 22 and second reflector 23 will be about 14 to 30. In other words, the finesse F and the enhancement factor $G_0$ will be about the same value.

The results of various numerical analyses performed based on the aforesaid formulas (1) to (6) will be described below. Note that, in the following numerical analyses, the dipole of the light emitters 1 (atoms) is directed to a direction along the spherical basis vector. Further, "$\Phi_0$" in formula (5) is an even multiple of π, and an even-order resonance is generated within the cavity. In such a resonance condition, the center of the resonator portion 11 (i.e., the center between the first reflector 22 and the second reflector 23) is located at the loops of the quasi-standing wave in the guide field generated within the resonator portion 11. In other words, the light emitters 1 are located at the loops of the quasi-standing wave in the guide field generated within the resonator portion 11. Further, in the following numerical analyses, the wavelength of the atomic transition of the light emitters 1 is 852 nm. Furthermore, the refractive index of the optical waveguide portion 21 is 1.45, and the refractive index of the surround space (vacuum), which serves as the clad in the resonator portion 11, is 1.

(1) Analysis 1

In analysis 1, in the configuration of the optical nanofiber resonator 10 of the present embodiment, an investigation was conducted regarding the relationship between the reflectivity $|R|^2$ of each reflector and any one of: the rate of radiation mode $\gamma_{rad}$, the rate of propagation mode $\gamma_{cavgyd}$ (=$G_0\gamma_{gyd}$), and the total spontaneous emission $\Gamma$(=$\gamma_{rad}$+$\gamma_{cavgyd}$). Incidentally, in analysis 1, the radius a of the optical waveguide portion 21 was 200 nm.

Figure 5:
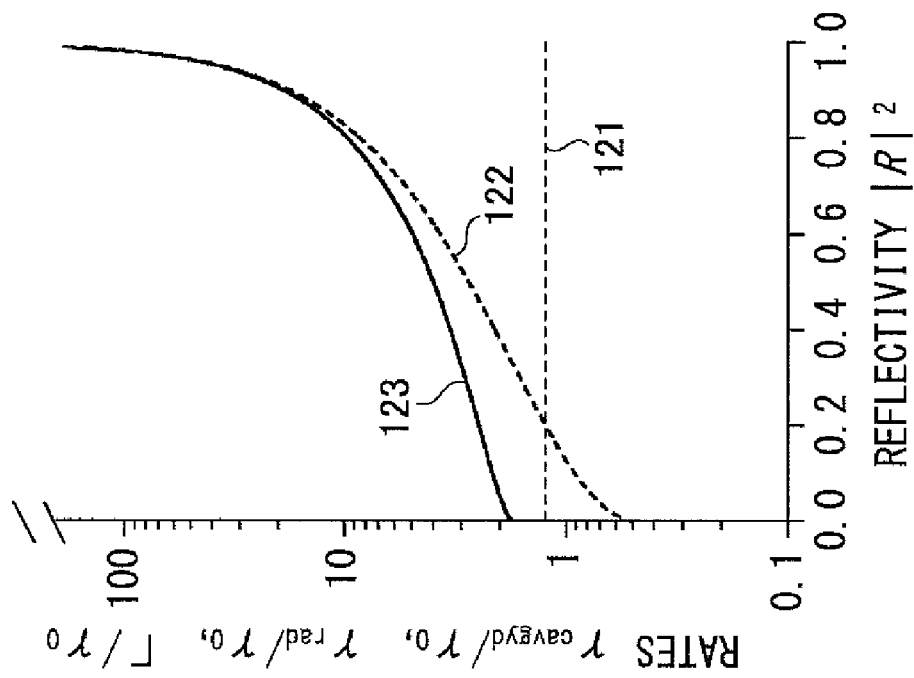
FIG. 5 is a graph showing the result of analysis 1 of the optical nanofiber resonator according to the first embodiment of the present invention.

FIG. 5 shows the result of analysis 1. The horizontal axis of the characteristic graph of FIG. 5 represents reflectivity $|R|^2$, and the vertical axis represents values respectively obtained by normalizing the rate of radiation mode $\gamma_{rad}$, the rate of propagation mode $\gamma_{cavgyd}$, and the total spontaneous emission $\Gamma$ with a free space decay rate $\gamma_0$ (=$2\omega_0^3 d^2/(3h\varepsilon_0 c^3)$, where c represents the speed of light). In FIG. 5, characteristic 121 is a characteristic of the rate of radiation mode $\gamma_{rad}$, characteristic 122 is a characteristic of the rate of propagation mode $\gamma_{cavgyd}$, and characteristic 123 is a characteristic of the total spontaneous emission $\Gamma$.

It can be known from the analysis result shown in FIG. 5 that the rate of radiation mode $\gamma_{rad}$ (i.e., the characteristic 121) is constant regardless of the value of the reflectivity $|R|^2$ of each reflector, while the rate of propagation mode $\gamma_{cavgyd}$ (i.e., the characteristic 122) increases when the reflectivity $|R|^2$ increases. Particularly, when the reflectivity $|R|^2$ exceeds about 0.8 (80%), the rate of propagation mode $\gamma_{cavgyd}$ rapidly increases.

(2) Analysis 2

In analysis 2, an investigation was conducted regarding the relationship between the radius a of the optical waveguide portion 21 and any one of: the rate of radiation mode $\gamma_{rad}$, the rate of propagation mode $\gamma_{cavgyd}$, and the total spontaneous emission $\Gamma$. However, in analysis 2, the reflectivity $|R|^2$ of the first reflector 22 and second reflector 23 is 0.9.

Figure 6:
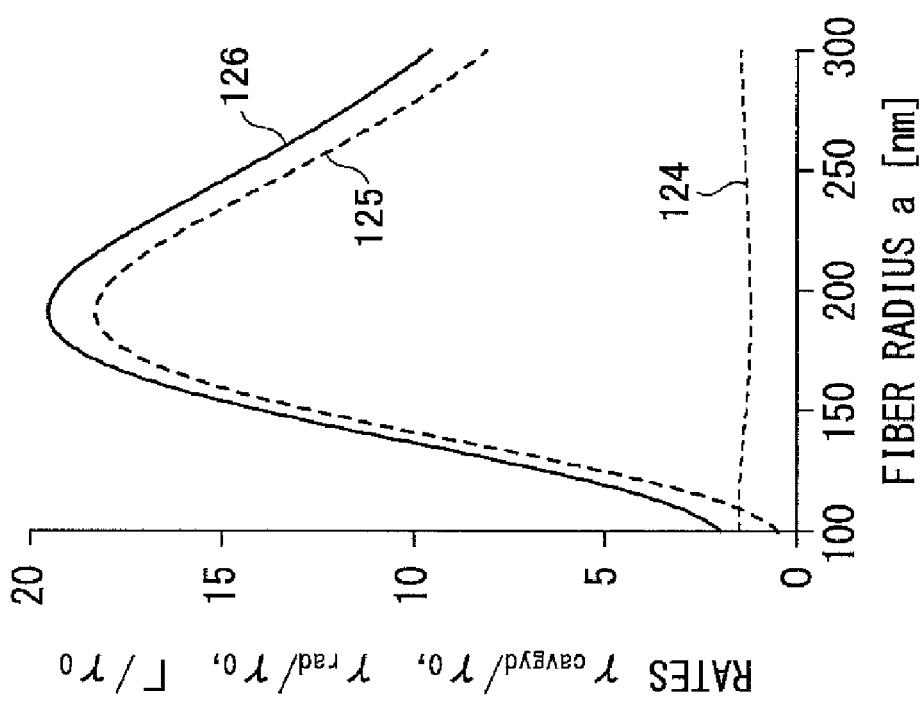
FIG. 6 is a graph showing the result of analysis 2 of the optical nanofiber resonator according to the first embodiment of the present invention.

FIG. 6 shows the result of analysis 2. The horizontal axis of the characteristic graph of FIG. 6 represents the radius a of the optical waveguide portion 21, and the vertical axis represents values respectively obtained by normalizing the rate of radiation mode $\gamma_{rad}$, the rate of propagation mode $\gamma_{cavgvd}$, and the total spontaneous emission Γ with the free space decay rate $\gamma_0$. In FIG. 6, characteristic 124 is a characteristic of the rate of radiation mode $\gamma_{rad}$, characteristic 125 is a characteristic of the rate of propagation mode $\gamma_{cavgvd}$, and characteristic 126 is a characteristic of the total spontaneous emission Γ.

It can be known from the analysis result shown in FIG. 6 that the rate of radiation mode $\gamma_{rad}$ (i.e., the characteristic 124) is substantially constant regardless of the value of the reflectivity $|R|^2$ of each reflector, while the rate of propagation mode $\gamma_{cavgvd}$ (i.e., the characteristic 125) reaches the maximum value at a predetermined radius a. In the present example, the rate of propagation mode $\gamma_{cavgvd}$ reaches the maximum value when the radius a becomes about 191 nm.

It can be known from the result of analysis 2 that, in order to increase the rate of propagation mode $\gamma_{cavgvd}$, the radius a of the optical waveguide portion 21 is preferably set to about a quarter of the wavelength (852 nm in the present example) of the propagation light (in the present example, the radius a of the optical waveguide portion 21 is preferably set to about 191 nm). In other words, in order to increase the rate of propagation mode $\gamma_{cavgvd}$, the diameter of the optical waveguide portion 21 is preferably set to about the half wavelength of the propagation light.

(3) Analysis 3

Figure 7:
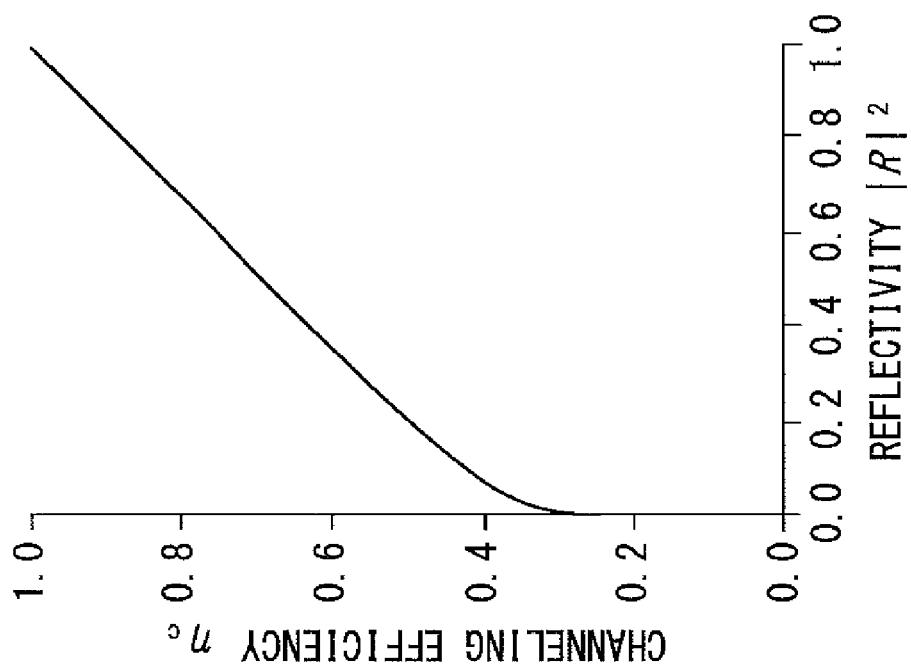
FIG. 7 is a graph showing the result of analysis 3 of the optical nanofiber resonator according to the first embodiment of the present invention.

In analysis 3, an investigation was conducted regarding the relationship between the coupling efficiency $\eta_c$ of the optical nanofiber resonator 10 according to the present embodiment (the above formula (4)) and the reflectivity $|R|^2$ of each reflector, based on the result of analysis 1. FIG. 7 shows the result of analysis 3. The horizontal axis of the characteristic graph of FIG. 7 represents the reflectivity $|R|^2$, and the vertical axis represents the coupling efficiency $\eta_c$ (i.e., the channeling efficiency).

As can be known from the analysis result shown in FIG. 7, the coupling efficiency $\eta_c$ (i.e., the channeling efficiency of the photons from the light emitters 1 into the optical waveguide portion 21) increases when the reflectivity $|R|^2$ increases; and when the reflectivity $|R|^2$ becomes a value close to 1, the coupling efficiency $\eta_c$ also becomes a value close to 1 (100%). To be specific, when the reflectivity $|R|^2$ is 0.8 to 0.9, the coupling efficiency $\eta_c$ becomes 0.87 (87%) to 0.94 (94%).

(4) Analysis 4

Figure 8:
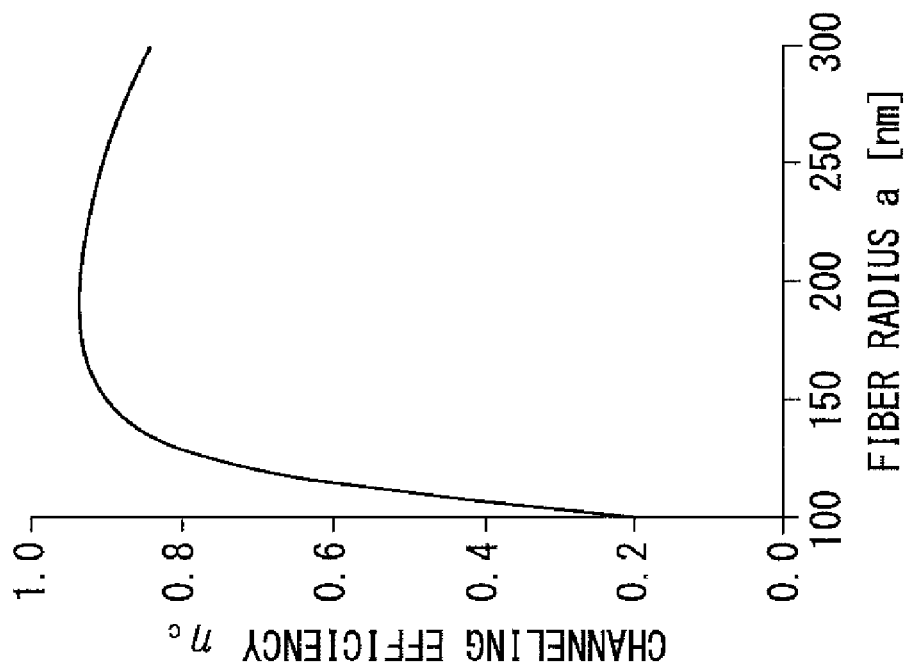
FIG. 8 is a graph showing the result of analysis 4 of the optical nanofiber resonator according to the first embodiment of the present invention.

In analysis 4, an investigation was conducted regarding the relationship between the coupling efficiency $\eta_c$ of the optical nanofiber resonator 10 according to the present embodiment (the above formula (4)) and the radius a of the optical waveguide portion 21, based on the result of analysis 2. FIG. 8 shows the result of analysis 4. The horizontal axis of the characteristic graph of FIG. 8 represents the radius a of the optical waveguide portion 21, and the vertical axis represents the coupling efficiency $\eta_c$ (i.e., the channeling efficiency).

As can be known from the analysis result shown in FIG. 8, the coupling efficiency $\eta_c$ reaches the maximum value when the radius a becomes about 191 nm. It can be known from this result that, in the present embodiment, in order to increase the coupling efficiency $\eta_c$ (the rate of propagation mode $\gamma_{cavgvd}$), the diameter of the optical waveguide portion 21 is preferably set to about half of the wavelength of the propagation light.

Further, it can be known from the analysis result shown in FIG. 8 that large coupling efficiency $\eta_c$ can be obtained when the radius a is in a wide range near 191 nm. To be specific, in the case where the reflectivity $|R|^2$=0.9, when the radius a is in a range of about 130 nm to 300 nm, a coupling efficiency $\eta_c$ of about 80% or higher can be obtained. In other words, in the case where the reflectivity $|R|^2$ is high enough, sufficient coupling efficiency $\eta_c$ can be obtained even when the diameter of the optical waveguide portion 21 is set to a value substantially equal to the wavelength of the propagation light.

(5) Analysis 5

In analysis 5, an investigation was conducted regarding the relationship between the arrangement position of the light emitters 1 (atoms) and any one of: the rate of radiation mode $\gamma_{rad}$, the rate of propagation mode $\gamma_{cavgvd}$, and the total spontaneous emission Γ. However, in analysis 5, the reflectivity $|R|^2$ of each reflector is 0.9, and the radius a of the optical waveguide portion 21 was 200 nm.

Figure 9:
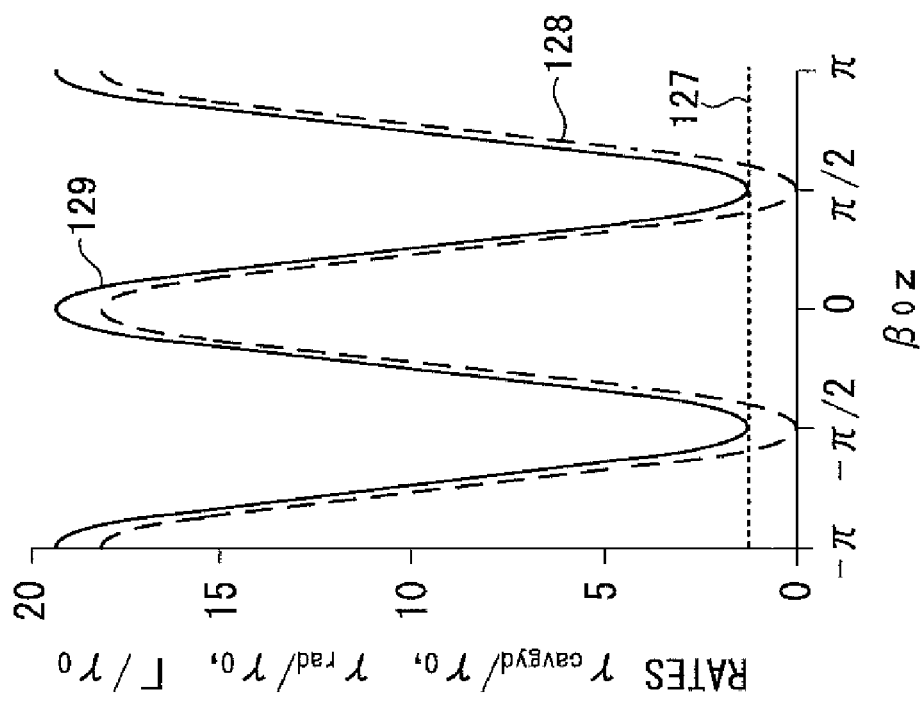
FIG. 9 is a graph showing the result of analysis 5 of the optical nanofiber resonator according to the first embodiment of the present invention.

FIG. 9 shows the result of analysis 5. The horizontal axis of the characteristic graph of FIG. 9 represents a parameter $\beta_0 z$ which indicates the arrangement position of the light emitters 1, and the vertical axis represents values respectively obtained by normalizing the rate of radiation mode $\gamma_{rad}$, the rate of propagation mode $\gamma_{cavgvd}$, and the total spontaneous emission Γ with the free space decay rate $\gamma_0$. In FIG. 9, characteristic 127 is a characteristic of the rate of radiation mode $\gamma_{rad}$, characteristic 128 is a characteristic of the rate of propagation mode $\gamma_{cavgvd}$, and characteristic 129 is a characteristic of the total spontaneous emission Γ.

As can be known from the analysis result shown in FIG. 9, the rate of radiation mode $\gamma_{rad}$ (i.e., characteristic 127) is constant regardless of the arrangement position of the light emitters 1. On the other hand, the rate of propagation mode $\gamma_{cavgvd}$ (i.e., characteristic 128) reaches the maximum value when the light emitters 1 are disposed at positions $\beta_0 z=0$ and $\beta_0 z=\pm\pi$ (i.e., when the light emitters 1 are disposed at positions corresponding to the loops of the quasi-standing wave in the guide field generated within the cavity). Further, the rate of propagation mode $\gamma_{cavgvd}$ reaches the minimum value when the light emitters 1 are disposed at positions $\beta_0 z=\pm\pi/2$ (i.e., when the light emitters 1 are disposed at positions corresponding to the nodes of the quasi-standing wave in the guide field generated within the cavity). As a result, the total spontaneous emission Γ also reaches the maximum value when the light emitters 1 are disposed at positions $\beta_0 z=0$ and $\beta_0 z=\pm\pi$, and reaches the minimum value when the light emitters 1 are disposed at positions $\beta_0 z=\pm\pi/2$.

(6) Analysis 6

Figure 10:
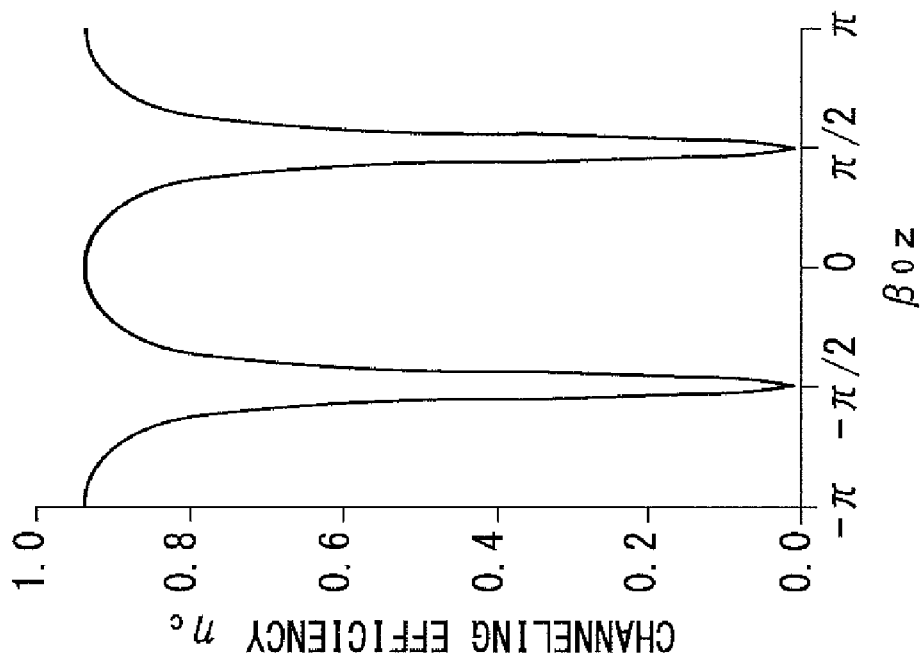
FIG. 10 is a graph showing the result of analysis 6 of the optical nanofiber resonator according to the first embodiment of the present invention.

In analysis 6, an investigation was conducted regarding the relationship between the coupling efficiency $\eta_c$ of the optical nanofiber resonator 10 according to the present embodiment and the arrangement position of the light emitters 1 (atoms), based on the result of analysis 5. FIG. 10 shows the result of analysis 6. The horizontal axis of the characteristic graph of FIG. 10 represents the parameter $\beta_0 z$ which indicates the arrangement position of the light emitters 1, and the vertical axis represents the coupling efficiency $\eta_c$ (i.e., the channeling efficiency).

As can be known from the analysis result shown in FIG. 10, the coupling efficiency $\eta_c$ also reaches the maximum value when the light emitters 1 are disposed at positions $\beta_0 z=0$ and $\beta_0 z=\pm\pi$ (i.e., positions corresponding to loops of the quasi-standing wave), and reaches the minimum value when the light emitters 1 are disposed at positions $\beta_0 z=\pm\pi/2$ (i.e., positions corresponding to nodes of the quasi-standing wave).

However, it can be known from FIG. 10 that the coupling efficiency $\eta_c$ slowly reduces when $\beta_0 z$ is near 0 and $\pm\pi$, and rapidly reduces when $\beta_0 z$ is near $\pm\pi/2$. It can be known from this fact that, in the present embodiment, sufficiently high coupling efficiency $\eta_c$ can be obtained even if the arrangement position of the light emitters 1 is slightly displaced from the positions corresponding to the loops of the quasi-standing wave in the guide field.

It can be known by summarizing the various analysis results described above that, in the optical nanofiber resonator 10 according to the present embodiment, it is possible to increase the channeling efficiency (i.e., coupling efficiency $\eta_c$) of photons from the light emitters 1 into the optical nanofiber 2 by arranging a resonator in the optical nanofiber 2, the resonator being configured by the optical waveguide portion 21, the first reflector 22 and the second reflector 23.

Figure 15:
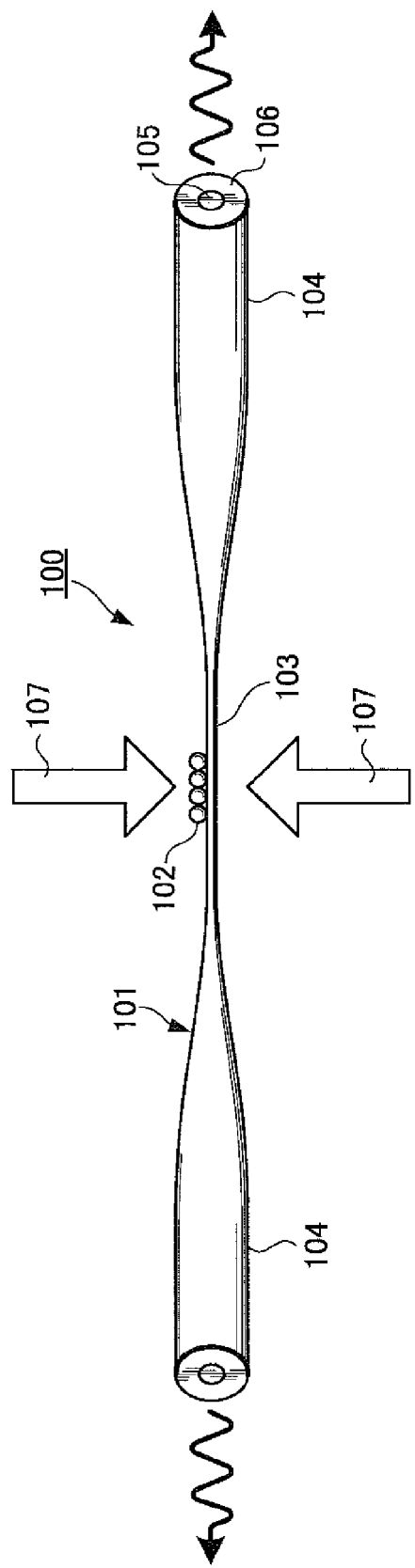
FIG. 15 is a view schematically showing the configuration of a single photon generating element using a conventional optical nanofiber.
Figure 16:
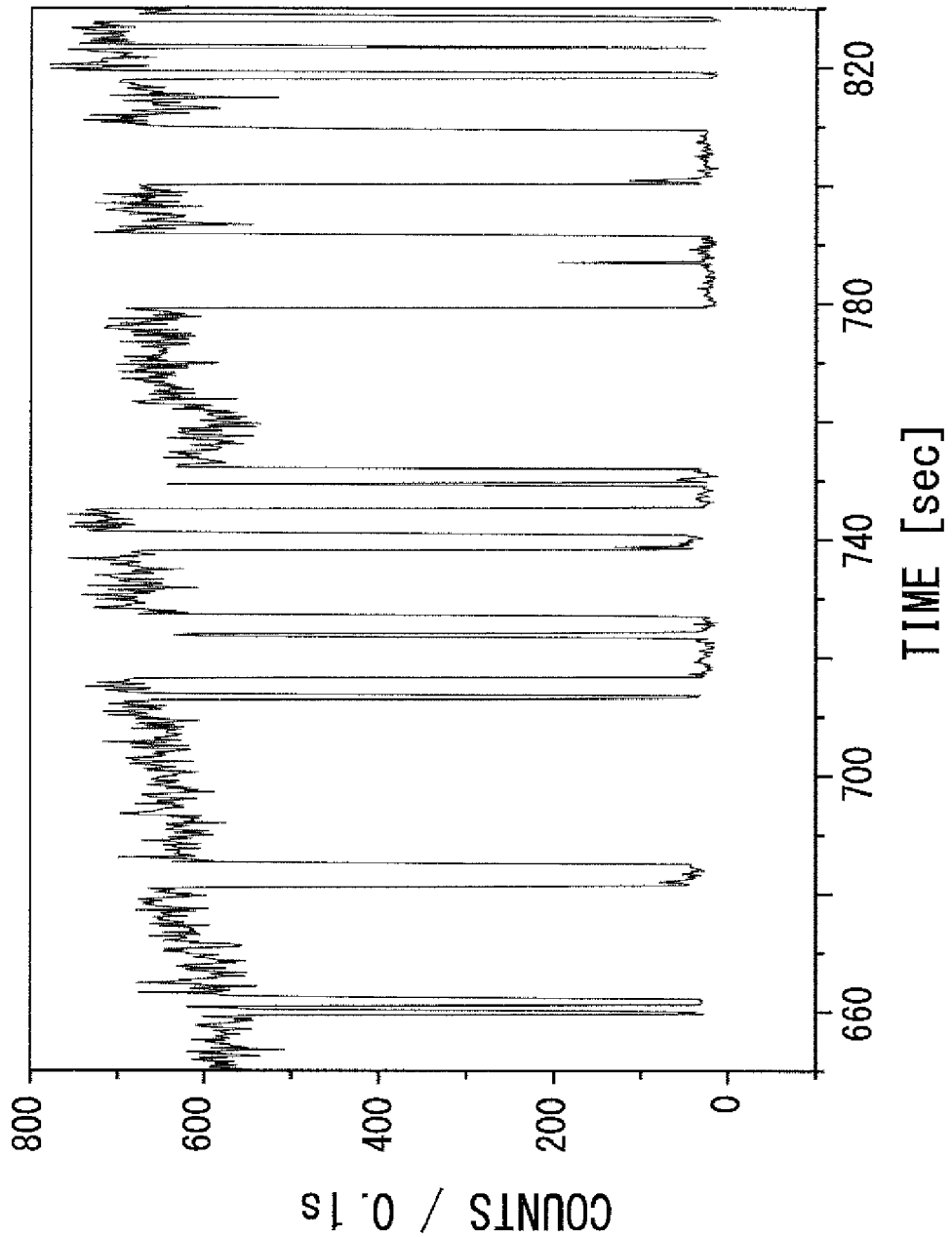
FIG. 16 is a graph showing a detection result of photons emitted from a conventional single photon generating element.

To be specific, sufficiently high coupling efficiency $\eta_c$ (for example, 80% or higher) can be obtained by setting the diameter of the optical waveguide portion 21 to a value equal to or less than the wavelength of the propagation light and increasing the reflectivity $|R|^2$ of each reflector to a certain level (for example, 0.8 or larger). Particularly, a coupling efficiency $\eta_c$ of 87% to 94% can be obtained by setting the diameter to a value substantially equal to the half wavelength of the propagation light and setting the reflectivity $|R|^2$ of each reflector to about 0.8 to 0.9. Since the coupling efficiency $\eta_c$ of the single photon generating element 100, in which a conventional optical nanofiber having no reflector is used, shown in FIG. 15 is about 10% to 20%, it can be known that the coupling efficiency $\eta_c$ can be dramatically increased with the configuration of the present embodiment.

Further, in the optical nanofiber resonator 10 of the present embodiment, it is preferred that the light emitters 1 are disposed at the positions corresponding to the loops of the quasi-standing wave in the guide field; however, it is known from the result of analysis 6 that sufficiently high coupling efficiency $\eta_c$ can be obtained even if the arrangement position of the light emitters 1 is slightly displaced from the positions corresponding to the loops of the quasi-standing wave in the guide field.

Further, as methods for generating single photons, a method using a micro-resonator configured by micro concave mirrors is conventionally proposed; however, the finesse F necessary for the micro-resonator of such a method is about 50000. In contrast, in the present embodiment, the finesse F necessary for the resonator configured by the optical waveguide portion 21, the first reflector 22 and the second reflector 23 is about 14 to 30 as described above, and therefore the finesse F can be set to a very small value compared to the method in which the micro-resonator is used.

As described above, in the optical nanofiber resonator 10 according to the present embodiment, it is possible to efficiently emit the photons through the guided mode of the optical fiber; therefore the optical nanofiber resonator 10 can be preferably used as a photon generating source in the quantum information communication. Further, the optical nanofiber resonator 10 according to the present embodiment not only can be used as a single photon generating source, but also can be used as a correlated photon pair generating source. Thus, the optical nanofiber resonator 10 according to the present embodiment not only can be applied to the quantum cryptographic communication, but also can be applied to further advanced quantum information communication technology such as quantum memory, quantum teleportation and the like.

2. Second Embodiment

Configuration of Optical Nanofiber Resonator

Figure 11:
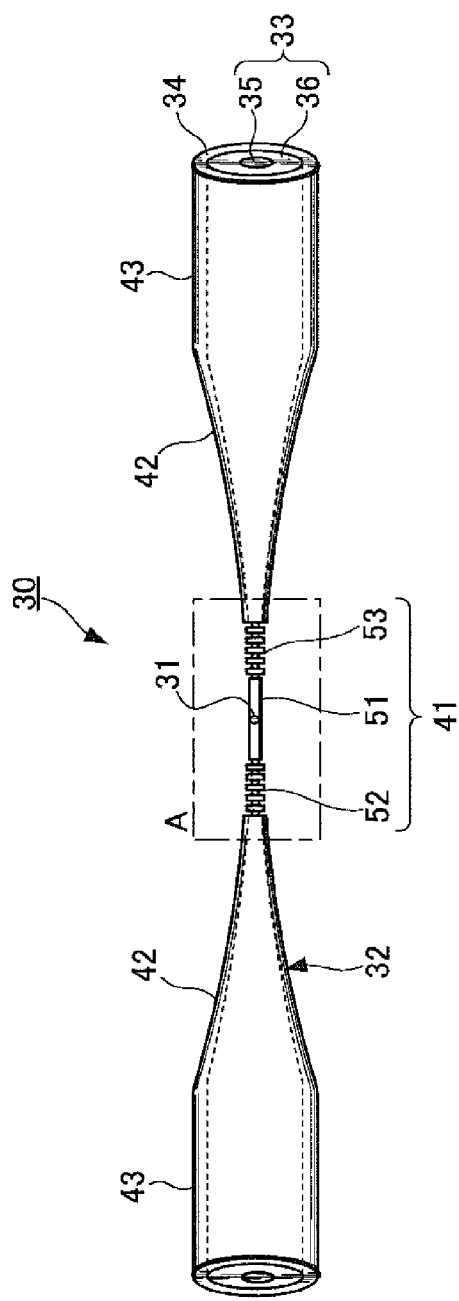
FIG. 11 is a view schematically showing the configuration of an optical nanofiber resonator according to a second embodiment of the present invention.

FIG. 11 schematically shows the configuration of an optical nanofiber resonator according to a second embodiment of the present invention. The optical nanofiber resonator 30 according to the present embodiment includes a light emitter 31 and an optical nanofiber 32. The light emitter 31 may have the same configuration as that of the light emitters 1 of the first embodiment described above.

The optical nanofiber 32 includes a core portion 33 and a coating layer 34 formed on the core portion 33. The core portion 33 is produced using an optical fiber for communication formed of a material having excellent optical waveguide characteristics (i.e., a material with small photon absorption) such as quartz or the like. Further, the coating layer 34 is formed on a material excellent in workability such as a polymer or the like. Further, in the present embodiment, reflectors are formed in the coating layer 34.

Further, the optical nanofiber 32 includes a resonator portion 41 extending in a predetermined direction (the right-left direction in FIG. 11), two connecting portions 42 respectively arranged on both ends of the resonator portion 41, and two optical fiber portions 43 each arranged on an end of each connecting portion 42 on the opposite side to the resonator portion 41 side. Incidentally, both the connecting portions 42 and the optical fiber portions 43 are configured by the core portion 33 and the coating layer 34 formed on the core portion 33, and other aspects of the configuration of both the connecting portions 42 and the optical fiber portions 43 are identical those of the connecting portions 12 and the optical fiber portions 13 of the first embodiment described above.

Figure 12:
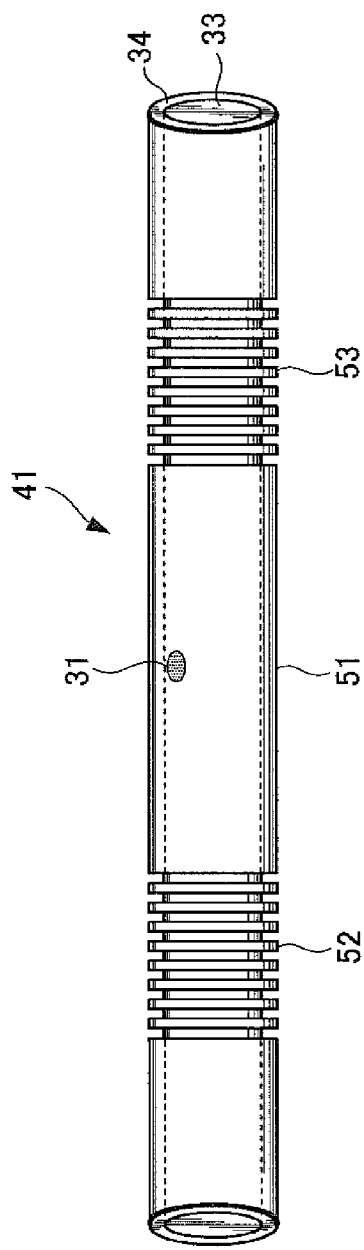
FIG. 12 is a view showing a resonator portion of the optical nanofiber resonator according to the second embodiment in an enlarged manner.

FIG. 12 is an enlarged view of an area A bounded by a dashed line in FIG. 11. The resonator portion 41 includes an optical waveguide portion 51, a first reflector 52 arranged in an end area of one side (the left side of FIG. 12) of the optical waveguide portion 51, and a second reflector 53 arranged in an end area of the other side (the right side of FIG. 12) of the optical waveguide portion 51. The optical waveguide portion 51 is configured by the core portion 33 and the coating layer 34 formed on the core portion 33, and other aspects of the configuration of the optical waveguide portion 51 are identical those of the optical waveguide portion 21 of the first embodiment described above.

In the present embodiment, the first reflector 52 and the second reflector 53 have the same configuration. Both the first reflector 52 and the second reflector 53 are configured by forming a plurality of grooves in the coating layer 34 at a predetermined pitch. Incidentally, in the present embodiment, the core portion 33 is exposed from the bottom of the grooves formed in the coating layer 34, and thereby the resonator configured by the optical waveguide portion 51, the first reflector 52 and the second reflector 53 is configured.

Incidentally, in the present embodiment, the light emitter 31 is disposed between the core portion 33 and the coating layer 34 of the optical nanofiber 32. In other words, in the present embodiment, the light emitter 31 is disposed inside the resonator portion 41. Because of this feature, it is possible to more improve the channeling efficiency (i.e., the coupling efficiency $\eta_c$) of photons from the light emitter 31 into the optical nanofiber 32.

[Method for Producing Optical Nanofiber Resonator]

A method for producing the optical nanofiber resonator 30 will be described below with reference to FIGS. 13A to 13E.

First, similar to the first embodiment, a conventional optical fiber for communication is prepared, the optical fiber including a core and a clad. Next, a part of the optical fiber for communication is heated, and the optical fiber for communication is elongated so that the diameter of the heated area becomes a predetermined diameter (i.e., a diameter substantially equal to or smaller than the wavelength of the propagation light). By performing such a process, in the heated and elongated part, the core portion 33 of the resonator portion 41 is formed, and at the same time the core portion 33 of both the connecting portions 42 and the optical fiber portions 43 is formed, wherein the diameter of the core portion 33 of the resonator portion 41 is of nanometer order.

Figure 13A:
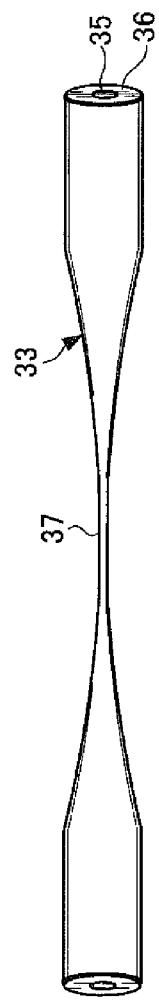
FIGS. 13A to 13E are views for explaining steps for producing the optical nanofiber resonator according to the second embodiment.

FIG. 13A is a view showing the appearance of the core portion 33 of the optical nanofiber resonator 30 formed by the aforesaid heating and elongating process. By performing the heating and elongating process, an ultrafine portion 37 is formed at the center of the core portion 33, wherein the diameter of the ultrafine portion 37 is substantially equal to or smaller than the wavelength of the propagation light. Incidentally, since the diameter of the ultrafine portion 37 is smaller than the cut-off diameter of the core, there is actually no difference between the core 35 and the clad 36, and therefore the whole ultrafine portion 37 functions as the core. Further, in the present embodiment, since the core portion 33 is also formed using a conventional optical fiber for communication, the both end portions of the core portion 33 not being heated and elongated are configured by the core 35 and the clad 36.

Next, similar to the first embodiment, the light emitter 31 is disposed at a predetermined position of the ultrafine portion 37 of the core portion 33 formed by heating and elongating the optical fiber for communication.

Figure 13B:
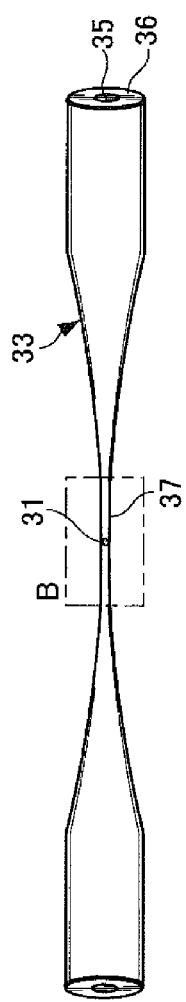
Figure 13C:
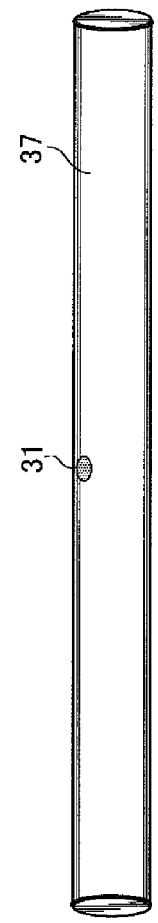

FIG. 13B is a view showing the appearance of the core portion 33 after the light emitter 31 has been disposed. Further, FIG. 13C is an enlarged view of an area B bounded by a dashed line in FIG. 13B (i.e., an enlarged view showing the area near the ultrafine portion 37). In the present embodiment, the light emitter 31 is disposed substantially at the center of the ultrafine portion 37 and on the surface of the ultrafine portion 37.

Next, a transparent material excellent in workability such as a polymer or the like is coated on the surface of the core portion 33, on which the light emitter 31 is disposed, to form the coating layer 34.

Figure 13D:
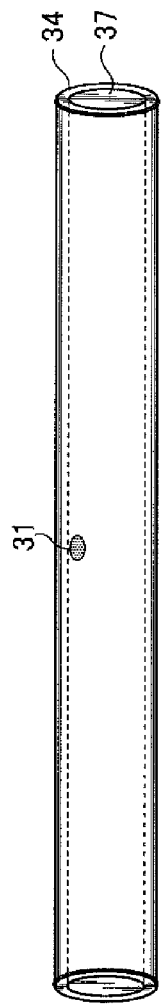

FIG. 13D is a view showing the appearance of an area near the ultrafine portion 37 after the coating layer 34 has been formed on the core portion 33. By performing aforesaid process for forming the coating layer 34, the coating layer 34 is formed also on the light emitter 31, so that the light emitter 31 is embedded into the resonator portion 41.

Next, in the coating layer 34, the first reflector 52 and the second reflector 53 are formed in predetermined positions with the light emitter 31 interposed in between. In the present embodiment, the first reflector 52 and the second reflector 53 are formed by photoetching.

To be specific, first, a photomask is formed in the area excluding the area for forming the first reflector 52 and the second reflector 53 by using a photolithography technology. Next, the area not photomasked of the coating layer 34 is removed, and thereby a plurality of grooves are formed in the coating layer 34 at a predetermined interval in a manner in which the core portion 33 is exposed from the bottom of the grooves. As a result, the first reflector 52 and the second reflector 53 are formed in the resonator portion 41 by forming a plurality of grooves and a part of the coating layer 34 between the grooves.

Figure 13E:
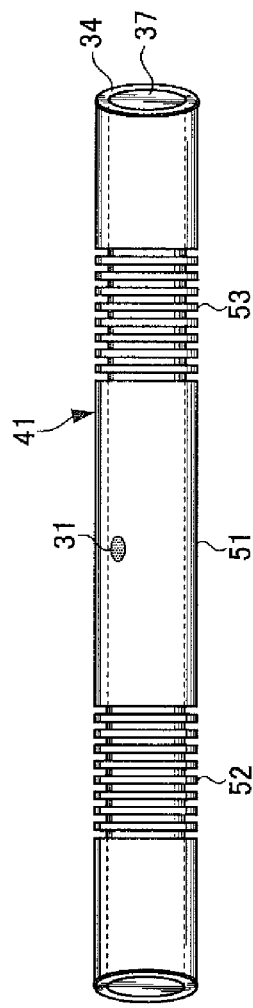

FIG. 13E is a view showing the appearance of the resonator portion 41 after the first reflector 52 and the second reflector 53 have been formed. In the present embodiment, the first reflector 52 and the second reflector 53 are formed so that the light emitter 31 is disposed substantially at the center between the first reflector 52 and the second reflector 53.

As described above, similar to the aforesaid first embodiment, in the optical nanofiber resonator 30 according to the present embodiment, the resonator configured by the optical waveguide portion 51, the first reflector 52 and the second reflector 53 is arranged in the optical nanofiber 32, and the light emitter 31 is disposed inside the resonator. Thus, similar to the aforesaid first embodiment, in the present embodiment, it is possible to dramatically improve the channeling efficiency (i.e., the coupling efficiency $\eta_c$) of photons from the light emitter 31 into the optical nanofiber 32 (the core portion 33) by suitably setting the diameter of the optical waveguide portion 51 and suitably setting the reflectivity $|R|^2$ (the configuration) of each reflector.

Further, similar to the first embodiment, in the present embodiment, the finesse F can be set to a very small value compared to the method in which the micro-resonator is used.

Further, in the optical nanofiber resonator 30 according to the present embodiment, the coating layer 34 formed of a material excellent in workability such as a polymer or the like is coated on the surface of the core portion 33, and the reflectors are formed in the coating layer 34. Thus, in the optical nanofiber resonator 30 according to the present embodiment, the resonator is easy to be processed, and therefore it is possible to improve mass productivity of the optical nanofiber resonator 30. Further, in the present embodiment, the core portion 33, which mainly propagates photons, is formed of a material having excellent optical waveguide characteristics such as quartz or the like. In other words, with the present embodiment, it is possible to provide the optical nanofiber resonator 30 which has excellent optical waveguide characteristics, and which is excellent in mass productivity.

3. Third Embodiment

In the first and second embodiments, examples are given in which the first reflector and the second reflector are configured by forming a recessed and projected pattern, however the present invention is not limited thereto. Instead of forming a recessed and projected pattern in the optical nanofiber, the reflectors may also be configured, for example, by alternately forming two areas having different refractive indexes along the extending direction of the optical nanofiber. In a third embodiment of the present invention, an example of such configuration will be described below.

Figure 14:
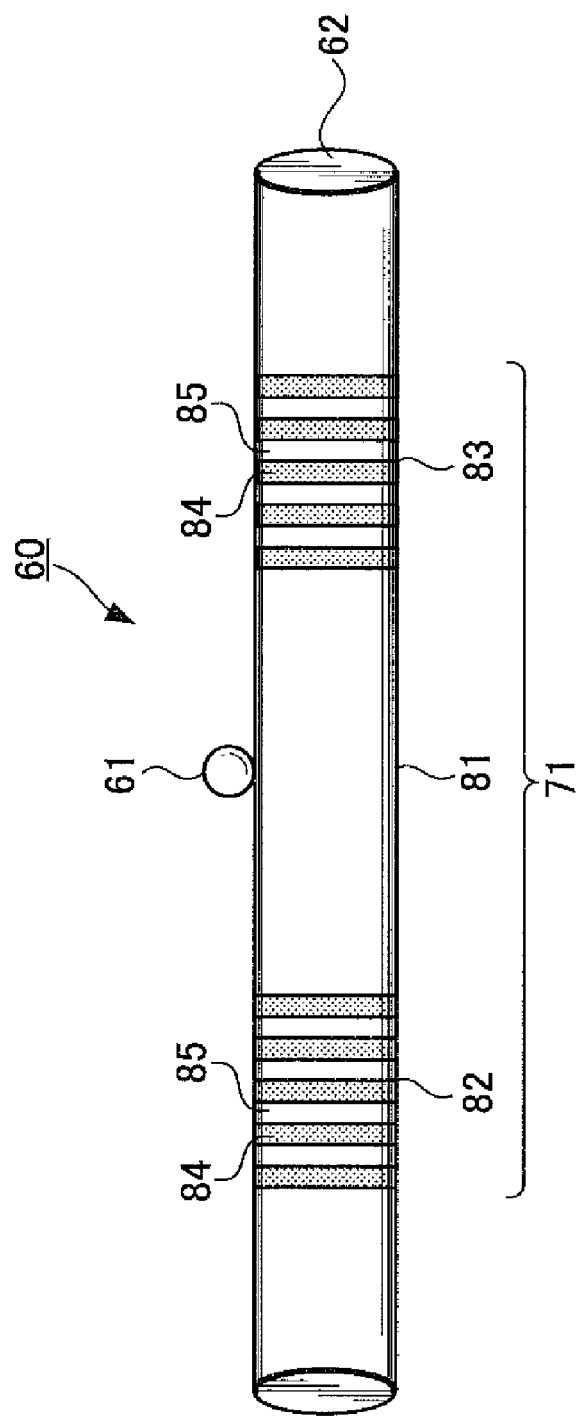
FIG. 14 is a view schematically showing the configuration of an optical nanofiber resonator according to a third embodiment of the present invention.

FIG. 14 is a view showing the appearance of an area near a resonator portion (i.e., an ultrafine portion) of an optical nanofiber resonator 60 according to the third embodiment of the present invention. The optical nanofiber resonator 60 according to the present embodiment includes a light emitter 61 and an optical nanofiber 62.

A resonator portion 71 of the optical nanofiber 62 includes an optical waveguide portion 81, a first reflector 82 and a second reflector 83. Similar to the first and second embodiments, in the present embodiment, the light emitter 61 is disposed substantially at the center between the first reflector 82 and the second reflector 83. Incidentally, the configuration, such as material, size and the like, of both the light emitter 61 and the optical nanofiber 62 are identical to those of the first embodiment.

In the present embodiment, the first reflector 82 and the second reflector 83 formed with the light emitter 61 interposed in between are each configured by a plurality of areas 84 (first areas) having a first refractive index and a plurality of areas 85 (second areas) having a second refractive index, wherein the first refractive index is different from the second refractive index. To be specific, each reflector is configured by alternately arranging the areas 84 and the areas 85 at a predetermined interval along the extending direction of the optical nanofiber 62.

The optical nanofiber resonator 60 of the present embodiment is produced following the steps below. First, similar to the first and second embodiments, the optical nanofiber 62 is produced by heating and elongating a part of a conventional optical fiber for communication. Next, the first reflector 82 and the second reflector 83 are formed in the optical waveguide portion 81 (the ultrafine portion) of the optical nanofiber 62 by, for example, a method using a phase mask.

In the method using a phase mask, a light emitted from an ultraviolet laser, a femtosecond pulsed laser or the like is irradiated to the optical waveguide portion 81 of the optical nanofiber 62 through a phase mask. At this time, interference fringes with a predetermined pitch are formed on the optical nanofiber 62. Thus, irradiation intensity of the light varies at the predetermined pitch, and therefore different areas (the areas 84 and the areas 85) having different refractive indexes are alternately formed at the predetermined pitch.

Next, after the first reflector 82 and the second reflector 83 are formed in the optical waveguide portion 81, the light emitter 61 is disposed substantially at the center between the first reflector 82 and the second reflector 83 in the same manner as the first embodiment. In the present embodiment, the optical nanofiber resonator 60 of the present embodiment shown in FIG. 14 can be produced in the aforesaid manner.

Similar to aforesaid the first and second embodiments, in the optical nanofiber resonator 60 according to the present embodiment, the resonator configured by the optical waveguide portion 81, the first reflector 82 and the second reflector 83 is arranged in the optical nanofiber 62, and the light emitter 61 is disposed inside the resonator. Thus, similar to the first embodiment, in the present embodiment, it is possible to dramatically improve the channeling efficiency (i.e., the coupling efficiency $\eta_c$) of photons from the light emitter 61 into the optical nanofiber 62 by suitably setting the diameter of the optical waveguide portion 81 and suitably setting the reflectivity $|R|^2$ (the configuration) of each reflector.

Further, in the present embodiment, since the same configuration as those of the first and second embodiments is employed, the finesse F can be set to a very small value compared to the method in which the micro-resonator is used.

Further, in the optical nanofiber resonator 60 according to the present embodiment, it is easier to form the first reflector 82 and the second reflector 83 in the case where the first reflector 82 and the second reflector 83 are formed, for example, by the method using a phase mask. Thus, in such case, it is possible to further improve mass productivity of the optical nanofiber resonator 60.

4. Modifications

Modification 1

In the aforesaid embodiments, examples are given in which the two reflectors (the first reflector and the second reflector) configuring the resonator have the same configuration, however the present invention is not limited thereto. The configuration of the two reflectors may be suitably changed according to usage and the like; and also, the two reflectors may be configured differently from each other.

For example, in the two reflectors, one reflector may be configured as a reflector that totally reflects the propagation light, so that the photons are emitted from one end portion of the optical nanofiber resonator. To be specific, in the first embodiment, the number of the gratings of either one of the first reflector 22 and the second reflector 23 may be increased so as to totally reflect the propagation light. Further, in the case where either one of the first reflector and the second reflector 23 is configured as a total reflection reflector, the connecting portion 12 and the optical fiber portion 13 on the side of the total reflection reflector may be omitted.

Modification 2

In the reflectors according to the examples given in the second and third embodiments, the grooves or areas having different refractive indexes are formed in the whole circumference of the coating layer or the optical nanofiber along the circumferential direction; however the present invention is not limited thereto.

In the second embodiment, it is also possible to etch a portion of the coating layer 34 in the circumferential direction so as to form a recessed and projected pattern (i.e., a reflector). For example, it is possible to form a plurality of recessed portions (holes) in the coating layer 34 along the extending direction of the resonator portion 41 so as to configure a reflector. Further, in the third embodiment, it is possible to form a plurality of areas having different refractive indexes in a portion in the circumferential direction of the optical nanofiber 62 so as to configure a reflector.

Modification 3

As described above, in the optical nanofiber resonator, it is preferred that the arrangement position of the light emitter(s) is adjusted to positions corresponding to the loops of the quasi-standing wave in the guide field generated within the resonator. However, the length of the optical nanofiber resonator in the longitudinal direction changes as the ambient temperature changes. In such as case, since the distance between two reflectors changes, the arrangement position of the light emitter is slightly displaced from the positions corresponding to the loops of the quasi-standing wave generated within the resonator depending on the ambient temperature.

As described in analysis 5 and analysis 6 of the first embodiment, in the optical nanofiber resonator having the configuration of the first embodiment, sufficiently high coupling efficiency $\eta_c$ can be obtained even if the arrangement position of the light emitters (the atoms) is slightly displaced from the positions corresponding to the loops of the quasi-standing wave in the guide field generated within the resonator. However, if the optical nanofiber resonator is applied to a use which requires high stability in coupling efficiency $\eta_c$, effect of the change in ambient temperature will be a serious problem. Particularly, in the case where the optical nanofiber resonator is formed of a polymer which has higher thermal expansion coefficient than that of quartz, effect of the change in ambient temperature will be large.

In order to solve the aforesaid problem, the optical nanofiber resonators according to the aforesaid embodiments may be provided with a temperature control device. In such a case, a feedback control is performed by the temperature control device to adjust the ambient temperature of the optical nanofiber resonator to a predetermined temperature. Incidentally, a conventional device used as a temperature control device for a semiconductor laser, for example, may be used as the temperature control device. Such a temperature control device can adjust the temperature with an accuracy of about 0.01 degree.

In the case the temperature control device is installed to the optical nanofiber resonator in the aforesaid manner, the arrangement position of the light emitter can be maintained at the most suitable position, and therefore it is possible to more efficiently obtain a stable coupling efficiency $\eta_c$.

What is claimed is:

1. An optical nanofiber resonator comprising:
   an optical waveguide whose diameter is equal to or smaller than the wavelength of a propagation light;
   a light emitter disposed at a predetermined position of the optical waveguide; and
   a first reflector and a second reflector formed in the optical waveguide with the light emitter interposed therebetween, wherein at least one of the first reflector and the second reflector transmits a part of the propagation light.

2. The optical nanofiber resonator according to claim 1, wherein the first reflector and the second reflector are each formed by a recessed and projected pattern having a predetermined pitch.

3. The optical nanofiber resonator according to claim 1, wherein the first reflector and the second reflector are each configured by alternately arranging first areas and second areas formed in the optical waveguide along the extending direction of the optical waveguide, the first areas having a first refractive index and the second areas having a second refractive index different from the first refractive index.

4. The optical nanofiber resonator according to claim 1, wherein both the first reflector and the second reflector satisfy the Bragg reflection condition.

5. The optical nanofiber resonator according to claim 1, wherein one of the first reflector and the second reflector is a total reflection reflector.

6. The optical nanofiber resonator according to claim 1, further comprising:
   an optical fiber portion including a core and a clad; and
   a connecting portion connecting the optical waveguide and the optical fiber portion, wherein the diameter of the connecting portion becomes continuously larger from the optical waveguide toward the optical fiber portion.

7. The optical nanofiber resonator according to claim 1, wherein the optical waveguide, the first reflector and the second reflector are formed of quartz.

8. The optical nanofiber resonator according to claim 1, wherein the optical waveguide, the first reflector and the second reflector are formed of a polymer.

9. The optical nanofiber resonator according to claim 1, wherein the optical waveguide has a core portion formed of quartz, and a coating layer formed of a polymer, the coating layer being formed on the core portion, and
   Wherein the first reflector and the second reflector are formed in the coating layer, and the light emitter is disposed between the core portion and the coating layer.

10. The optical nanofiber resonator according to claim 1, wherein the diameter of the optical waveguide is equal to the half wavelength of the propagation light.

11. The optical nanofiber resonator according to claim 1, wherein the light emitter is disposed at a position corresponding to a loop of the quasi-standing wave in a guide field generated between the first reflector and the second reflector.

12. The optical nanofiber resonator according to claim 1, further comprising a temperature control device.

* * * * *